(12) United States Patent
Akopian

(10) Patent No.: US 6,651,031 B2
(45) Date of Patent: Nov. 18, 2003

(54) METHOD FOR PROVIDING TIME USING A MULTIPLE-CLOCK MODEL AND A CLOCK SYSTEM USING SUCH A MODEL

(75) Inventor: David Akopian, Tampere (FI)

(73) Assignee: Nokia Corporation, Espoo (FI)

( * ) Notice: Subject to any disclaimer, the term of this patent is extended or adjusted under 35 U.S.C. 154(b) by 54 days.

(21) Appl. No.: 10/016,654

(22) Filed: Dec. 12, 2001

(65) Prior Publication Data

US 2003/0110015 A1 Jun. 12, 2003

(51) Int. Cl.$^7$ .............................. G04F 1/00; G04F 10/00
(52) U.S. Cl. ............................ 702/178; 702/176; 703/2
(58) Field of Search ................................ 702/189–199, 702/125, 178, 176, 89; 703/2, 3–5, 16, 17, 19; 342/357.06–357.15; 701/213, 214, 216; 713/500–503

(56) References Cited

U.S. PATENT DOCUMENTS

| 5,155,695 A | * 10/1992 | Stein | .......................... 702/178 |
| 5,315,566 A | * 5/1994 | Stein | .......................... 368/46 |
| 2003/0018462 A1 | * 1/2003 | Chen et al. | .................... 703/19 |

OTHER PUBLICATIONS

Greenhall, Charles A., "Kalman Plus Weights: A Time Scale Algorithm", Nov. 21, 2001.*
Greenhall, Charles A., "The Generalized Autocovariance: A Tool for Clock Noise Statistics", May 15, 2001, TMO Progress Report.*
Stein et al., "Kalman Filter Analysis for Real Time Applications of Clocks and Oscillators", 1988, 42nd Annual Frequency Control Symposium.*
"The Kalman Filter: Navigation's Integration Workhorse", by Larry J. Levy, in GPS World, Sep. 1997, pp. 65–71.

\* cited by examiner

*Primary Examiner*—Marc S. Hoff
*Assistant Examiner*—Andrew Morris
(74) *Attorney, Agent, or Firm*—Ware, Fressola, Van Der Sluys & Adolphson LLP

(57) ABSTRACT

An N-clock system, for use for example in a ranging receiver using a Kalman filter. The clock system uses N clocks (to save power by using some clocks that consume less power) with a schedule for switching from one clock to another (so that only one clock is on at any instant of time). It uses an N-clock model that, in case of an application using clock 1 for time interval $\Delta t_1$, clock 2 for time interval $\Delta t_2, \ldots$, and clock N for time interval $\Delta t_N$, provides a state update equation for updating the N-clock system state (the state components being typically time and fractional frequency). The state update equation results from propagating the state of the assembly of N clocks (providing a single output, i.e. acting as a single clock) forward from interval to interval until the entire interval of $\Delta t_1 + \Delta t_2 + \ldots + \Delta t_N$ is covered.

10 Claims, 5 Drawing Sheets

METHOD FOR PROVIDING TIME USING A MULTIPLE-CLOCK MODEL AND A CLOCK SYSTEM USING SUCH A MODEL

CROSS REFERENCE To RELATED APPLICATIONS

Reference is made to co-filed U.S. application entitled A CLOCK SYSTEM AND CORRESPONDING METHOD FOR PROVIDING A CLOCK TIME ACCOUNTING FOR SYSTEMATIC ERROR, filed on even date herewith.

The above application is assigned to the present assignee. The subject matter of the above application is hereby incorporated by reference.

1. Field of the Invention

The present invention relates to CDMA (Code Division Multiple Access) spread spectrum receivers, and more particularly to fast acquisition GPS (Global Positioning System) receivers.

2. Background of the Invention

Spread spectrum communication in its basic form is a method of taking a data signal used to modulate a sinusoidal carrier and then spreading its bandwidth to a much larger value, e.g. in a global positioning system (GPS) application, by multiplying a single-frequency carrier by a high-rate binary (−1,1) pseudo-random noise (PRN) code sequence known to GPS users. Thus, the signal that is transmitted includes a data component, a PRN component, and a (sinusoidal) carrier component.

At the receiver, a synchronized replica of the transmitted PRN code is required to de-spread the data sequence. Initial synchronization, called acquisition, is followed by fine synchronization, which is called tracking.

In a ranging receiver used by a user to determine the position of the user based on the distance of the receiver from GPS satellites, in good signal conditions a range measurement called pseudorange is determined from information provided by tracking channels of the receiver and also from navigation data sent by each of the satellites and decoded by the receiver.

The GPS positioning system relies on the ranging receiver being able to reference to one clock the time when it receives ranging signals from each of the different satellites, and the time the GPS satellites transmitted the ranging signals (and more specifically, a particular fragment of a ranging signal, called here the target signal fragment). The ranging receivers do not, however, as a matter of economics, use clocks that can be synchronized with the clock used by the GPS or the clocks used by the different GPS satellites. The clocks of ranging receivers are based on relatively inexpensive oscillators whose frequency varies, changing permanently in some situations, and changing only temporarily in others. Some causes are categorized as deterministic or causal (e.g. temperature, magnetic fields, and systematic drift) and some as non-deterministic (i.e. random or noise-like causes, such as random walk and so-called flicker noise).

In many navigation systems, Kalman filtering or similar techniques are used to determine a track for a receiver in which errors due to deficiencies in the local oscillator (and due to other sources of error as well) are smoothed out. The tracking is performed by having one or another type of navigation filter use an appropriate model of clock behavior. Conventional models of clock behavior are usually based on random, noise-like changes in frequency measured in the time domain; systematic changes are interpreted as random fluctuations (albeit on a longer time scale than actual random fluctuations), and the process noise covariance matrix in state equations used by the navigation filter is changed to account for such fluctuations.

In some GPS receivers, two clocks are included: a relatively inexpensive and correspondingly less accurate clock, and a more expensive and more accurate clock. The motivation for using two such clocks is that the more expensive clock is more of a power drain. The GPS receiver switches from one clock to the other according to a predetermined schedule for use in which one clock is used for some predetermined period of time and the GPS receiver then switches to the other clock for another (usually different) period of time.

Not unexpectedly, the different kinds of clocks are advantageously represented by different models so that the variation in frequency of the oscillator of each clock can be accounted for in a navigation solution, such as one using a navigation filter (e.g. a Kalman filter applied to the navigation problem). The prior art, however, does not provide for a clock model that includes switching between different clocks, which is necessary in the case of some kinds of navigation solutions because the time between measurements for a navigation solution is usually greater than the time between switching from one clock to another, so any navigation solution that depends on past measurements (such as a Kalman filter solution) involves time measurements made by both clocks.

SUMMARY OF THE INVENTION

Accordingly, in a first aspect of the invention, a method is provided for estimating a current state of a clock assembly of at least two clocks including a first clock and a second clock, each clock having a clock phase and a clock fractional frequency, the method including: a step, responsive to a schedule of operations indicating a first time period in a cycle of operation when the first clock is operative and a second time period when the second clock is operative, of providing a clock measurement indicating information about the clock assembly; and a step, responsive to the clock measurement and also responsive to the schedule of operations, for providing the estimate of a current state of the clock assembly using a state filter adapted to use a clock model for the clock assembly, the clock model indicating a state of the clock assembly via a state update process that includes a measure of process noise and that propagates the state of the first clock to the end of the first time period in accordance with the schedule of operations using a state update process for the first clock, uses the state so obtained as the starting state for the second clock at the start of a second time period, and propagates the starting state for the second clock to the end of the second period using a state update process for the second clock, and also for providing a corresponding measure of process noise covariance.

Further in accord with the first aspect of the invention, the measure of process noise may be a process noise vector, the measure of process noise covariance may be a process noise covariance matrix, and the clock measurement may indicate information about the phase and fractional frequency of the clock assembly, and the process noise covariance matrix corresponding to the estimate of the current state of the clock assembly may be based on taking the mathematical expectation of the outer product of the process noise vector of the state update process with itself. Still further, the step of providing the estimate of a current state of the clock assembly may be performed as part of a step of providing an estimate of a current state of a ranging receiver used in conjunction with beacons of a positioning system, and the method may also include a step of providing pseudoranges from the beacons of the positioning system. Further still, the state of the ranging receiver may include as components a clock phase component and a clock frequency component for the clock assembly and may also include either a position component or a velocity component indicating either the position or velocity of the ranging receiver, respectively.

In a second aspect of the invention, a clock system is provided for estimating a current state of a clock assembly including at least two clocks, the clock system including: the clock assembly, responsive to a schedule of operations indicating when in a cycle of operation each of the two clocks is operative, for providing clock signals indicating a clock measurement conveying information about the clock assembly; and a state filter, responsive to the clock signals indicating the clock measurement, and further responsive to the schedule of operations, for providing the estimate of the current state of the clock assembly, wherein the state filter is adapted to use a clock model for the clock assembly, the clock model indicating the state of the clock assembly via a state update process that includes a measure of process noise and that propagates the state of a first one of the clocks of the clock assembly to the end of a first time period in accordance with the schedule of operations using a state update process for the first clock, uses the state so obtained as the starting state for a second clock of the clock assembly at the start of a second time period, and propagates the starting state for the second clock to the end of the second period using a state update process for the second clock, and also for providing a corresponding measure of process noise covariance.

Further in accord with the second aspect of the invention, the measure of process noise may be a process noise vector, the measure of process noise covariance may be a process noise covariance matrix, the clock measurement may indicate information about the phase and fractional frequency of the clock assembly, and the process noise covariance matrix corresponding to the estimate of the current state of the clock assembly may be based on taking the mathematical expectation of the outer product of the process noise vector of the state update process with itself.

Also, a ranging receiver for use with beacons of a positioning system is provided, including a clock system in accord with the second aspect of the invention, and also a navigation solver, wherein the state filter is adapted for use in the ranging receiver as part of the navigation solver, and wherein the state filter is further responsive to pseudoranges determined from signals provided by the beacons of the positioning system, and wherein the state estimated by the state filter includes the state of the clock assembly as well as the state of the ranging receiver in respect to an aspect of the position of the ranging receiver as a function of time. Further, the measure of process noise may be a process noise vector, the measure of process noise covariance may be a process noise covariance matrix, the clock measurement may indicate information about the phase and fractional frequency of the clock assembly, and the process noise covariance matrix corresponding to the estimate of the current state of the clock assembly may be based on taking the mathematical expectation of the outer product of the process noise vector of the state update process with itself. Further still, the state of the ranging receiver may include as components a clock phase component and a clock fractional frequency component, and may also include either a position component or a velocity component indicating either the position or velocity of the ranging receiver, respectively. Also further still, In addition, the invention provides a system including a ranging receiver according to the invention for use with a positioning system and also the beacons of the positioning system.

The invention makes possible using with a Kalman filter an assembly of several clocks as a principal component of a clock system that uses first one of the clocks and then another, and so on, according to a predetermined schedule adapted to one or another clock switching scheme and navigation filter discretization; and with the invention, clock error is reduced.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides a clock model for use for example by a ranging receiver in which (as a power-savings strategy) two clocks are used, a more precise, more power-consuming clock, and a less precise, less power-consuming clock, and the ranging receiver switches from one clock to the other between navigation solutions so that the variation of the local oscillator frequency of each clock must be taken into account in the navigation solutions. The invention includes a generalization to an arbitrary number of clocks.

Although the invention is described in the context of a ranging receiver, it should be understood that the invention, a two-clock system (including a two-clock model), can be used not only in a ranging receiver but in any application requiring a time estimate. Moreover, although the invention is described below as a Kalman filter using a two-clock model, the invention encompasses any kind of state filter using a two-clock model according to the invention, i.e. any kind of filter for providing a best estimate of a current state of a system using not only current measurements of the state of the system but also past measurements and a predicted current state of the system.

A Generic Kalman Filter (According to the Prior Art)

Figure 1:
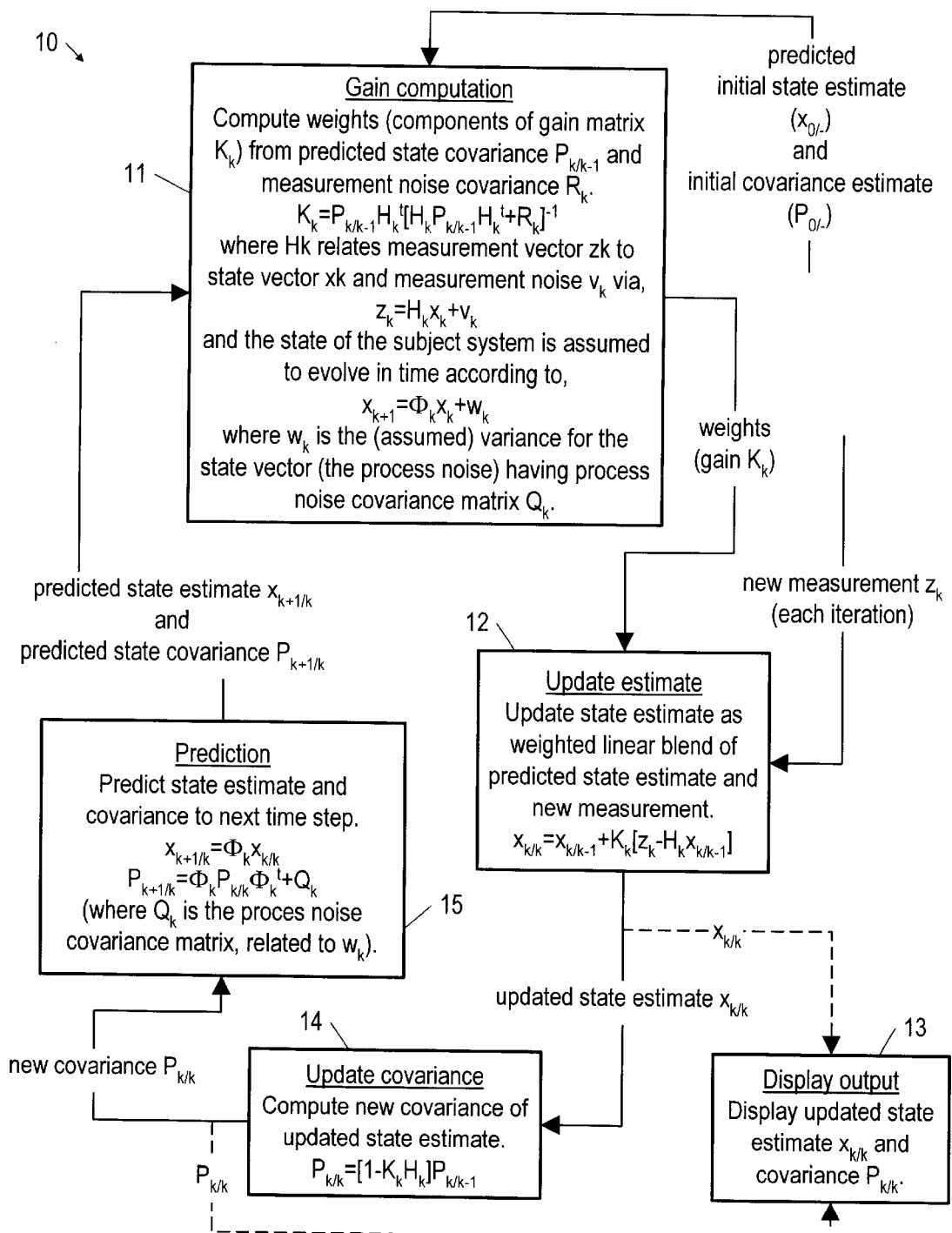
FIG. 1 is a block diagram/flow diagram of a generic Kalman filter of a type which would use a two-clock model provided according to the invention.

For background, a generic Kalman filter is described first. Referring to FIG. 1, a generic Kalman filter 10 is shown as a recursive (iterative), linear filter, in which at each iteration, a state estimate of a subject system is updated by combining new measurements with predicted state estimates from previous measurements using a weighting (the gain of the filter)

that gives more or less weight to the new measurements vis à vis the predicted state depending on the spread (or more generally the process noise covariance) of the measurements compared to the spread of the state updates. Because the state is typically a vector of scalar random variables (as opposed to a single variable), the state uncertainty estimate is a (process noise) covariance matrix (as opposed to simply a scalar variance). (The components of the state vector are sometimes, in a mathematically casual way, called scalar states.) Each diagonal term of the process noise covariance matrix is the variance of a scalar random variable representing a component of the state of the subject system (i.e. the mean squared deviation $\sigma^2$ from the mean of the random variable, a measure of the spread about the mean of the random variable), and serves as a measure of the uncertainty in the mean of the random variable. The off-diagonal matrix elements are the covariances that describe any correlation between pairs of variables. Since the diagonal terms are variances and the off-diagonal terms are covariances, the process noise covariance matrix might be (and sometimes is) more properly called a variance-covariance matrix.

Still referring to FIG. 1, each of the measurements, made at successive instants of time (and shown as an input to an update estimate module 12) is also a vector (like the state of motion quantity, i.e. the state vector), and an algorithm for a Kalman filter iteratively repeats for each new measurement (vector), using only measurement values stored from the immediately preceding iteration, not all past measurement values. Also, just as each measurement corresponds to one or another component of the state of the subject system, there is a measurement noise covariance matrix corresponding to the state (or process noise) covariance matrix. The measurement noise covariance matrix components are determined once and for all based on information about the measurement, i.e. the components represent uncertainties inherent in the measurement itself. Thus, the measurement noise covariance matrix is not updated.

Beginning with an initial predicted state estimate and its associated state (or process noise) covariance obtained from known information, in a first, gain computation step 11, the filter calculates the weights (or gain) to be used when combining the predicted state estimate with the first measurement vector to obtain an updated (optimum according to certain statistical assumptions and so "best") estimate. If the measurement noise covariance matrix is smaller (on a component by component basis) than the state (or process noise) covariance matrix for the predicted state estimate, the measurement's weight will be larger, and the predicted state estimate's weight will be smaller. The weighting of one scalar state (one component of the state vector) compared to that of another will be a function of how observable (i.e. the more readily measured) the different scalar states are in the measurement; the more observable, the higher the weight. This occurs because when the filter calculates an updated state estimate using the new measurement, the state (or process noise) covariance must also be changed to reflect the information just added, resulting in a reduced uncertainty for the scalar state.

In a next, update estimate step 12, the state estimate is updated to account for a new measurement. The updating involves forming a weighted combination of the new measurement and the predicted state estimate, based on the weights (gain) calculated in the previous step. One of the outputs of the Kalman filter 10 is the updated state estimate, which is provided to a display output module 13.

In a next, update (state) covariance step 14, the (state) covariance is updated based on the updated state estimate.

The updated covariance is also an output of the Kalman filter 10 and is provided to the output display module 13.

Finally, in a next, prediction step 15, the state vector is predicted for the next instant of time at which a measurement is scheduled, as is the covariance matrix. The covariance matrix is assumed to evolve with time based on the same model as is used to evolve the state vector, but the predicted covariance also includes a contribution from any possible actual random change in the state of the subject system (due for example to environmental effects such as exposure to relatively high or low temperatures). The predicted state estimate and the predicted (state) covariance matrix are then used in the gain computation step 11 to begin a next iteration. For a simple example of the use of a Kalman filter, see: *The Kalman Filter: Navigation's Integration Workhorse*, by Larry J. Levy, in GPS World, September 1997, pp. 65–71.

A two-clock model provided according to the invention is used in a Kalman filter, such as the Kalman filter 10 indicated in FIG. 1, in providing timing for a ranging receiver, such as a GPS receiver.

Single-Clock Model According to the Prior Art

For further background, a single-clock model according to the prior art is described next.

In the prior art, clock modeling (for a single-clock system) is performed using two sets of equations. The first set defines so-called state dynamics (where the ranging receiver is predicted to be based on a model of the motion of the receiver and based on values for the parameters of the model such as current position, current velocity and acceleration), and the second set relates the measurements (of current position and possibly velocity) to the states (position, velocity, acceleration, and possibly jerk). The conventional clock model for GPS receivers uses a two-state model. In continuous time, the state dynamics are described by the following differential equations:

$$\begin{bmatrix} \dot{x}_1(t) \\ \dot{x}_2(t) \end{bmatrix} = \begin{bmatrix} 0 & 1 \\ 0 & 0 \end{bmatrix} \begin{bmatrix} x_1(t) \\ x_2(t) \end{bmatrix} + \begin{bmatrix} f_1(t) \\ f_2(t) \end{bmatrix} \quad (1)$$
$$= \begin{bmatrix} x_2(t) \\ 0 \end{bmatrix} + \begin{bmatrix} f_1(t) \\ f_2(t) \end{bmatrix}$$
$$= x_2(t)f_1(t) + f_2(t)$$

where $x_1$, $x_2$ are the phase and the fractional frequency (i.e. the change in frequency per unit frequency) respectively, and $f_1$, $f_2$ are noise components, i.e. are fluctuations in the time and fractional frequency due to random causes (such as environmental factors) and determine the process noise covariance matrix $Q_k$. (A clock phase measurement alone, at any instant of time, gives an estimate of clock time at the instant of time. Clock phase and clock fractional frequency measurements in combination, over a period of time, allow a filter, such as a Kalman filter, to provide a more precise value for clock time than clock phase alone (at the instant of time) would provide.) The measurement equation is simple for the clock, the measurement being simply the estimate of the time.

(A clock generator produces a waveform that in general can be represented by the following term:

$$A \sin[(\omega_0 t + \phi_0) + (\phi_e + \omega_e t + 2\pi dt^2/2) + x(t)]$$

in which the quantity $(\omega_0 t + \phi_0)$ represents the desired clock phase. The next term, $(\phi_e + \omega_e t + 2\pi dt^2/2)$, represents the causal phase error effects, where $\phi_e$ is a fixed phase error offset, and where $\omega_e$ is a frequency error that may be a function of one or another aspect of the clock's environment (e.g. temperature, magnetic field, acceleration, or pressure), and where the term, $2\pi dt^2/2$, represents a frequency drift or aging effect. The final term, x(t), represents a random phase error. In analyzing these effects, the causal errors ($\phi_e+\omega_e t+2\pi dt^2/2$) are separated from the random phase error x(t).)

In discrete time, the state equation is replaced by an equation relating the values of $x_1$, $x_2$ at one moment of time to their values after an increment of time (using as an increment the step size $\Delta t$) according to a process model formulated as, $$\begin{bmatrix} x_1 \\ x_2 \end{bmatrix}_{k+1} = \begin{bmatrix} 1 & \Delta t \\ 0 & 1 \end{bmatrix} \begin{bmatrix} x_1 \\ x_2 \end{bmatrix}_k + \begin{bmatrix} w_1 \\ w_2 \end{bmatrix}_k \qquad (2)$$
$$= \Phi_k \vec{x}_k + \vec{w}_k$$

in which $\Phi_k$ is called the state transition matrix (the subscript k indicating that $\Phi_k$ depends on $\Delta t$, which, though not expressly indicated, depends on the subscript k in that $\Delta t = t_{k+1} - t_k$ and in general can be different for different k), and for which a (process noise) covariance matrix of the noise components $w_{1,k}$, $w_{2,k}$ is defined as $$Q_k = \begin{bmatrix} E(w_{1,k}^2) & E(w_{1,k}w_{2,k}) \\ E(w_{1,k}w_{2,k}) & E(w_{1,k}^2) \end{bmatrix} = E(\vec{w}_k \vec{w}_k^t), \qquad (3)$$

(the notation E( ... ) indicating the operation of taking the mathematical expectation of the indicated argument, as in eq. (5) below) where $Q_k$ is a function of $\Delta t$ in that $w_{1,k}$, $w_{2,k}$ are each functions of $\Delta t$, which is made evident by the relationship between the noise components in continuous and discrete time, namely, $$w_k(\Delta t) = \int_0^{\Delta t} \Phi_k(\Delta t - \tau) f(\tau) d\tau, \text{ for } \Delta t = t_k - t_{k-1}. \qquad (4)$$

Denoting $S_1$, $S_2$ as spectral amplitudes of $f_1$, $f_2$, in case of the simple process model given by equation (2), we have $$\begin{aligned} Q_k(\Delta t) = E(w_k w_k^t) &= \int_0^{\Delta t} \int_0^{\Delta t} \Phi_k(\Delta t - \tau) E(f(\tau) f(\sigma)^t) \Phi_k(\Delta t - \sigma) d\sigma d\tau \qquad (5) \\ &= \int_0^{\Delta t} \int_0^{\Delta t} \Phi_k(\Delta t - \tau) W \delta(\sigma - \tau) \Phi_k(\Delta t - \sigma) d\sigma d\tau \\ &= \int_0^{\Delta t} \Phi_k(\Delta t - \tau) W \Phi_k(\Delta t - \tau) d\tau \\ &= \int_0^{\Delta t} \begin{bmatrix} 1 & \Delta t - \tau \\ 0 & 1 \end{bmatrix} \begin{bmatrix} S_1 & 0 \\ 0 & S_2 \end{bmatrix} \begin{bmatrix} 1 & 0 \\ \Delta t - \tau & 1 \end{bmatrix} d\tau \\ &= \begin{bmatrix} S_1 \Delta t + \frac{S_2 \Delta t^3}{3} & S_2 \Delta \frac{t^2}{2} \\ S_2 \Delta \frac{t^2}{2} & S_2 \Delta t \end{bmatrix} \end{aligned}$$

For white noise, the spectral amplitudes $S_1$, $S_2$ can be expressed in terms of well known Allan variance parameters $h_i$; for example, the spectral amplitudes can be approximated as $S_1 = 2h_0$; $S_2 = 8\pi^2 h_{-2}$.

Two-Clock Model

Now, according to the invention, the navigation solution uses a two-clock model, in which the receiver switches alternately from a good (i.e. precise but power-consuming) clock to a poor (i.e. less precise but less power-consuming) clock. The model assumes that during a first period with duration $\Delta t_1$, the good clock provides time measurements used in the navigation solution, and during the next period with duration $\Delta t_2$ the poor clock gives the time measurements. It is further assumed that the time from switching to the first clock and then to the second clock and then back to the first clock (a round trip duty cycle) is equal to the updating epoch of the navigation solution (a navigation solution such as would be performed using for example a Kalman filter), although the invention encompasses other switching schedules as well, as discussed below.

During the first period $\Delta t_1$, the state update equations are (as in the one-clock model):

$$\begin{bmatrix} x_1 \\ x_2 \end{bmatrix}_{k+1} = \begin{bmatrix} 1 & \Delta t_1 \\ 0 & 1 \end{bmatrix} \begin{bmatrix} x_1 \\ x_2 \end{bmatrix}_k + \begin{bmatrix} w_{1,k} \\ w_{2,k} \end{bmatrix} \sim \vec{x}_{k+1} = \Phi_{k+1,k} x_k + \vec{w}_k \qquad (6)$$

where the clock model process noise covariance matrix is given by, $$Q_k(\Delta t_1) = \begin{bmatrix} E(w_{1,k}w_{1,k}) & E(w_{1,k}w_{2,k}) \\ E(w_{1,k}w_{2,k}) & E(w_{2,k}w_{2,k}) \end{bmatrix} = E(\vec{w}_k \vec{w}_k^t). \qquad (7)$$

The two-state model above is a simple model, which assumes that both the oscillator frequency and phase random walk over (reasonable spans of) time. Flicker, a particular variety of noise common to all types of clocks, is not included, and it is not trivial to include it, but as explained below, it is possible to modify the Q matrix so to include the effects of flicker. An example of a clock model process noise covariance matrix $Q_k(\Delta t_1)$ that does not take into account a flicker component is:

$$Q_k(\Delta t_1) = \begin{bmatrix} S_1^g \Delta t_1 + \frac{S_2^g \Delta t_1^3}{3} & \frac{S_2^g \Delta t_1^2}{2} \\ \frac{S_2^g \Delta t_1^2}{2} & S_2^g \Delta t_1 \end{bmatrix} \qquad (8)$$

where $S_1^g$, $S_2^g$ are spectral amplitudes of the good clock, expressible in terms of Allan variance parameters as $$S_1^g = 2h_{0,g}; \quad S_2^g = 8\pi^2 h_{-2,g} \qquad (9)$$

During the second period $\Delta t_2$, the state update equations are (as in the one-clock model):

$$\begin{bmatrix} x_1 \\ x_2 \end{bmatrix}_{k+2} = \qquad (10)$$

$$\begin{bmatrix} 1 & \Delta t_2 \\ 0 & 1 \end{bmatrix} \begin{bmatrix} x_1 \\ x_2 \end{bmatrix}_{k+2} + \begin{bmatrix} w_{3,k+1} \\ w_{4,k+1} \end{bmatrix} \sim \vec{x}_{k+2} = \Phi_{k+2,k+1} x_{k+1} + \vec{w}_{k+1}$$

(the components of $\vec{w}_{k+1}$ can be inferred to be $w_{3,k+1}$ and $w_{4,k+1}$ as opposed to $w_{1,k+1}$ and $w_{2,k+1}$ because of the part of the cycle of operations referred to by the index k+1) with a clock model process noise covariance matrix given by $$Q_{k+1}(\Delta t_2) = \begin{bmatrix} E(w_{3,k+1}w_{3,k+1}) & E(w_{3,k+1}w_{4,k+1}) \\ E(w_{3,k+1}w_{4,k+1}) & E(w_{4,k+1}w_{4,k+1}) \end{bmatrix}. \qquad (11)$$

Again, an example of such a flicker-free clock model process noise covariance matrix $Q(\Delta t_2)$ is, for a poor clock, given by:

$$Q_{k+1}(\Delta t_2) = \begin{bmatrix} S_1^{cb}\Delta t_2 + \frac{S_2^{cb}\Delta t_2^3}{3} & \frac{S_2^{cb}\Delta t_2^2}{2} \\ \frac{S_2^{cb}\Delta t_2^2}{2} & S_2^{cb}\Delta t_2 \end{bmatrix} \quad (12)$$

where $S_1^{bc}$, $S_2^{bc}$ are spectral amplitudes of the poor clock, expressible in terms of Allan variances as, $$S_1^{cb} = 2h_{0,cb}; \quad S_2^{cb} = 8\pi^2 h_{-2,cb} \quad (13)$$

assuming that the poor clock has statistics similar to those of the good clock.

To arrive at a two-clock model, the invention combines the two models, one for the interval $\Delta t_1$ and the other for the interval $\Delta t_2$, the intervals in sum making the interval between measurements, by substituting the state values at time k+1 described by eq. (6) into the right hand side of eq. (10), and so provides the state update equation, $$\begin{bmatrix} x_1 \\ x_2 \end{bmatrix}_{k+2} = \begin{bmatrix} 1 & \Delta t_1 + \Delta t_2 \\ 0 & 1 \end{bmatrix} \begin{bmatrix} x_1 \\ x_2 \end{bmatrix}_k + \begin{bmatrix} w_{1,k} + \Delta t_2 w_{2,k} + w_{3,k+1} \\ w_{2,k} + w_{4,k+1} \end{bmatrix} \quad (14)$$

$$\sim \vec{x}_{k+2} = \Phi_{k+2,k}\vec{x}_k + \vec{w}_{(k+1,k)}$$

in which $\overline{w}_{(k+1,k)}$ is used to indicate the process noise vector $$\begin{bmatrix} w_{1,k} + \Delta t_2 w_{2,k} + w_{3,k} \\ w_{2,k} + w_{4,k} \end{bmatrix}$$

which involves process noise at both the time indicated by the index k and the time indicated by the index k+1. The subscript k+1,k is enclosed in parenthesis to indicate that the quantity $\overline{w}_{(k+1,k)}$ is a vector (i.e. a one-dimensional mathematical object), not a matrix (a two-dimensional mathematical object, such as $\Phi_{k+2,k}$). The above-described procedure for obtaining eq. (14) from eqs. (6) and (10) can be expressed as follows:

$$\vec{x}_{k+2} = \Phi_{k+2,k+1}\vec{x}_k + \vec{w}_{k+1} = \Phi_{k+2,k+1}(\Phi_{k+1,k}\vec{x}_k + \vec{w}_k) + \vec{w}_{k+1}$$
$$= \Phi_{k+2,k}\vec{x}_k + \Phi_{k+2,k+1}\vec{w}_k + \vec{w}_{k+1}$$
$$= \Phi_{k+2,k}\vec{x}_k + \vec{w}_{(k+1,k)}$$

where $\Phi_{k+2,k}$ and $\overline{w}_{(k+1,k)}$ are as indicated in eq. (14).

(In what follows, the k-dependence of the $W_{i,k}$ is sometimes suppressed.)

Thus, according to the invention, the state transition matrix $\Phi$ of a two-clock model according to the invention is the same as for a single-clock model (the time $\Delta t_1 + \Delta t_2$ of the two-clock model corresponding to the time $\Delta t_1$ of a single-clock model), but the noise component changes, and in fact includes a term ($\Delta t_2 w_2$) that depends on the schedule for switching between the two clocks.

Assuming that the process noise quantities from the two stages are uncorrelated so that, e.g. $E(w_1 w_3) = 0$, the overall two-clock model process noise covariance matrix is given by, where the k dependence has been suppressed, and where all the components in the matrix are taken from $Q(\Delta t_1)$, $Q(\Delta t_2)$, i.e. for example, $E(w_1 w_1)$ in eq. (15) is the same value as $E(w_1 w_1)$ occurring in the (1,1) component of $Q(\Delta t_1)$ given by eq. (7). Thus, the overall process noise covariance matrix given by eq. (15) is the mathematical expectation of the matrix formed from the vector so-called outer product of the process noise vector $\overline{w}_{(k+1,k)}$ with itself, i.e.

$$Q = E(\vec{w}_{(k+1,k)}\vec{w}^t_{(k+1,k)}) = E\left(\begin{pmatrix} w_{(k+1,k)1} \\ w_{(k+1,k)2} \end{pmatrix}(w_{(k+1,k)1} w_{(k+1,k)2})\right)$$
$$= E\begin{pmatrix} w_{(k+1,k)1}w_{(k+1,k)1} & w_{(k+1,k)1}w_{(k+1,k)2} \\ w_{(k+1,k)2}w_{(k+1,k)1} & w_{(k+1,k)2}w_{(k+1,k)2} \end{pmatrix}$$

where the $w_{(k+1,k)i}$ are the components of the process noise in eq. (14) so that, for example, $w_{(k+1,k)} = w_{1,k} + \Delta t_2 w_{2,k} + w_{3,k+1}$.

Note that the form of the combined covariance matrix Q given by eq. (15) is quite general, whereas the particular examples in (8) and (12) do not account for flicker. Eq. (15) does not however account for correlation between the two intervals; to account for such correlation, Q will include additional, cross-correlations between the clocks. As it is, eq. (15) is important in that it derives the combined clock model from separate clocks and the process noise covariance matrices for those clocks. If we know the statistical properties of each clock (e.g. the Allan variances), then we could compute the process noise covariances Q for each clock and then substitute to (15) to have a combined clock model.

The process noise covariance matrix Q given by eq. (15) is not restricted to using process noise covariance matrices Q given by eq. (8) and eq. (12). The invention also comprehends combining clock models with more than two states (i.e. where the clock is represented by a state vector having more than two components). All that is necessary to do is to appropriately extend the two-clock process noise covariance matrix Q given by eq. (15); for a three-state clock model, the extended two-clock process noise covariance matrix would have nine components, each of which would be determined from the process noise covariance matrix for the first clock and then the second clock by the same sort of multiplication as was used in determining the process noise covariance matrix Q given by eq. (15).

Now for a Kalman filer solution in case of measurements being linearly related to the state variable, and considering for the moment only a Kalman filter solution for the state of a clock, the measurement equation can be written as, $$z_k = Hx_k + v_k \quad (16)$$

where $x_k$ represents the state of the two-clock assembly at a time indicated by the index k (having as components $x_{1,k}$, $x_{2,k}$ representing the clock phase and fractional frequency respectively), $z_k$ is the measurement at the time indicated by the index k (having as components the clock phase and clock fractional frequency), the $v_k$ are measurement noise components, and the matrix H relates the state $x_k$ to the measurement $z_k$. If only clock phase is measured, then H=[1 0], and if clock fractional frequency is measured as well, then $$Q = \begin{bmatrix} E(w_1 w_1) + \Delta t_2^2 E(w_2 w_2) + 2\Delta t_2 E(w_1 w_2) + E(w_3 w_3) & E(w_1 w_2) + \Delta t_2 E(w_2 w_2) + E(w_3 w_4) \\ E(w_1 w_2) + \Delta t_2 E(w_2 w_2) + E(w_3 w_4) & E(w_2 w_2) + E(w_4 w_4) \end{bmatrix} \quad (15)$$

$$H = \begin{bmatrix} 1 & 0 \\ 0 & 1 \end{bmatrix}.$$

In a ranging receiver application (i.e. for a clock system according to the invention used in a ranging receiver), the actual measurements made are pseudoranges) along with clock phase, and these can be used to provide a so-called point solution for position, velocity and time (PVT) (called a point solution because only a single, current measurement, at a single point in time, is used in provided a solution); the point solution values become the values of the "measurements" z in eq. (16). In such an approach, point solutions are provided at successive instants of time and an ordinary Kalman filter then uses them as "measurements" in determining a current best estimate of the state variable x (a smoothed estimate). In addition, however, the clock model of the present invention can also be directly incorporated into a filter (an ordinary Kalman filter, an extended Kalman filter, or other filters that rely on more than a current measurement as the basis for an estimate of the current state of the subject object) by including the clock model per eqs. (14), (15), and (16) into the model for the larger system. When the clock model is directly incorporated into a ranging receiver application, the indirect measurements (such as pseudorange and delta-pseudorange) are used to estimate the clock parameters along with position, velocity, etc. In other words, the clock signals indicating clock phase and fractional frequency are provided to a filter (such as an extended Kalman filter) only indirectly in case of directly incorporating the clock model; i.e. a baseband processing module uses clock signals to figure the pseudoranges from raw signals provided by beacons of the positioning system, and so the clock measurements are implicit in the pseudoranges and never provided explicitly to the filter.

(An example of a filter with which a clock model according to the invention can be used is given in co-owned, co-pending U.S. application Ser. No. 09/444,840, entitled METHOD AND APPARATUS FOR FILTERING MEASUREMENTS USED IN A GENERALIZED POSITIONING SYSTEM, filed on Nov. 22, 1999, hereby incorporated by reference.)

Figure 2:
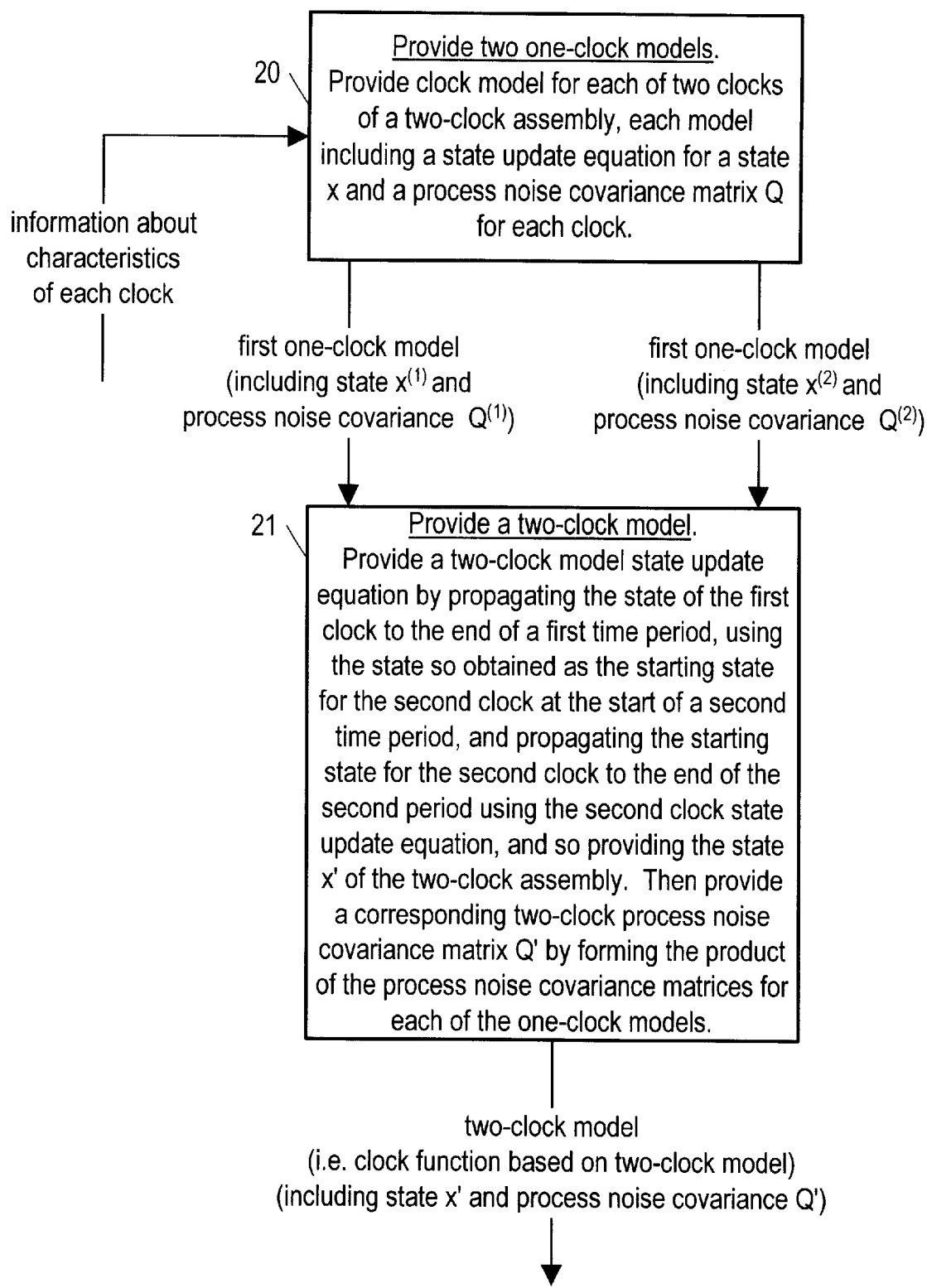
FIG. 2 is flowchart indicating how to construct a two-clock model according to the invention.

Referring now to FIG. 2, a flowchart is provided indicating how to make a two-clock model for use for example in a ranging receiver. It should be understood that the invention, in essence a clock system including a two-clock assembly and a state filter (such as a Kalman filter), can be used in other applications besides a ranging receiver. Any application where knowledge of the state of a clock is needed is a candidate application for a clock system according to the invention.

Referring still to FIG. 2, according to the invention, a method for making a two-clock model includes a first step 20 in which single-clock models are defined for each of two clocks, each including a state update equation for a corresponding state vector x (using $x^{(1)}$ to indicate the state for one clock and $x^{(2)}$ for the other) and a process noise covariance matrix for each clock (using $Q^{(1)}$ for the process noise covariance matrix for one clock, and $Q^{(2)}$ for the other). Then, in a next step 21, a two-clock model is provided. This step entails: providing a two-clock model state update equation for the two-clock assembly state indicated by x' by propagating the state of the first clock to the end of a first time period, using the state so obtained as the starting state for the second clock at the start of a second time period, and propagating the starting state for the second clock to the end of the second period using the second clock state update equation (as in eq. (14); and also providing a corresponding two-clock process noise covariance matrix Q' by forming the product of the process noise covariance matrices for each of the one-clock models (as in eq. (15)).

Still referring to FIG. 2, in somewhat more detail, the step 20 of providing two single-clock models involves first, obtaining a predetermined schedule for switching from a first clock to a second clock and back to the first clock, the round-trip duty cycle having a period equal to the time between measurements in a navigation solution using e.g. a Kalman filter (although the time between measurements need not equal a round-trip duty cycle, and indeed the time between measurements equals a round-trip duty cycle only in a particularly simple scheme, as explained below); next, defining a model for the clock to be used in the first time period in the switching schedule (as in eq. (6)), and also defining a model for the clock to be used in the second time period (as in eq. (10)); and finally, defining a process noise covariance matrix for each clock (as in eqs. (7) and (11)). The step 21 involves: first, providing a two-clock model state update equation (as in eq. (14)), i.e. an equation to be used to provide the state of the two-clock system at the end of the second period given the state at the beginning of the first period by propagating the state of the first clock to the end of the first time period, using the state so obtained as the starting state for the second clock at the start of the second time period, and propagating the starting state for the second clock to the end of the second period using the second clock state update equation; next, making suitable assumptions regarding the statistical dependence of the process noise for the two clocks; and finally, providing the two-clock process noise covariance matrix Q' (as in eq. (15)) based on the assumed statistical dependence of the process noise covariance matrix for the two clocks.

Figure 3:
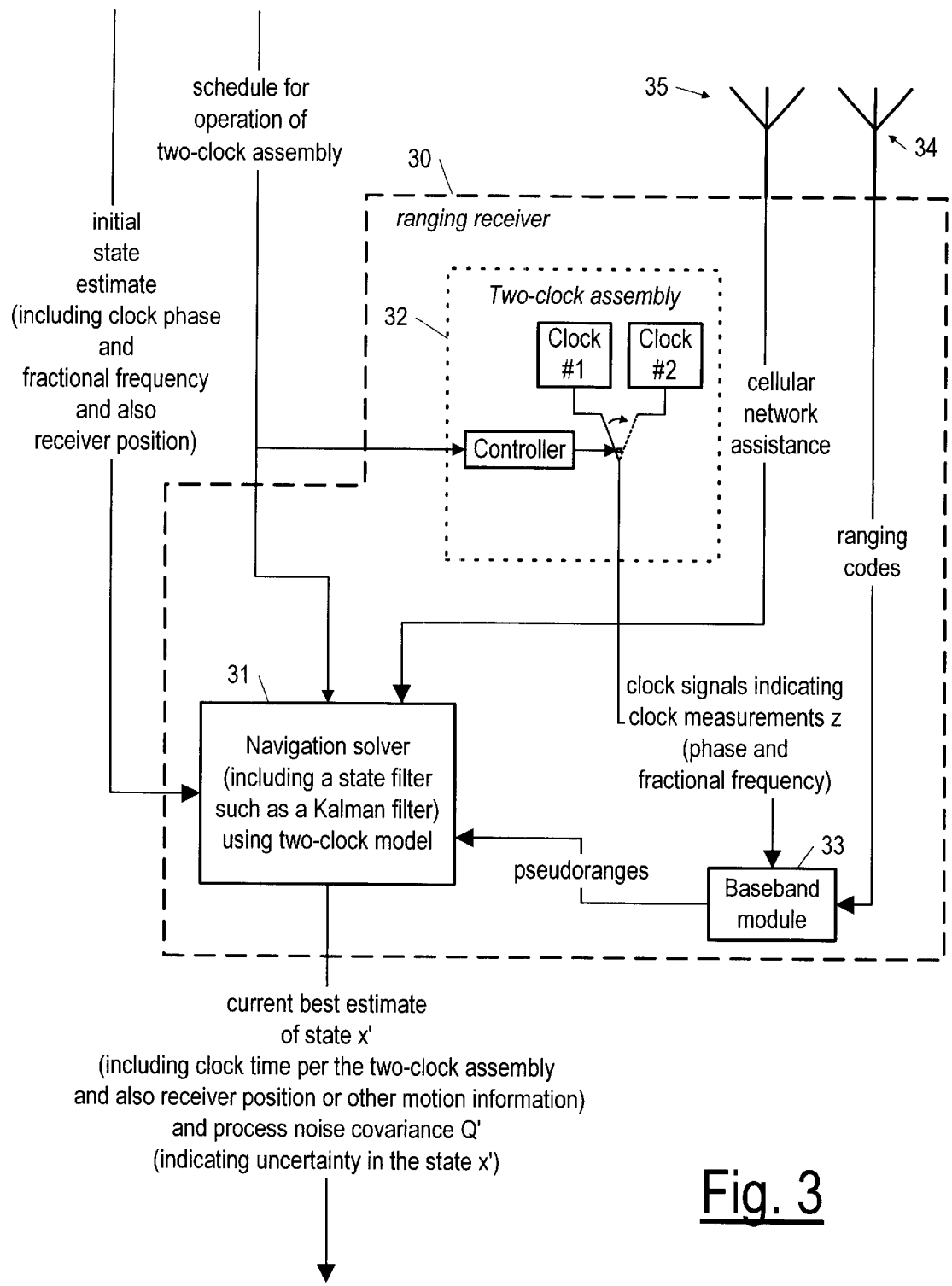
FIG. 3 is a block diagram of aspects of a ranging receiver using a navigation filter that in turn uses a state filter (such as a Kalman filter) adapted to a two-clock model according to the invention.

Referring now to FIG. 3, a ranging receiver 30 (such as a GPS receiver) according to the present invention is shown as including a two-clock assembly 32 in which two clocks operate under the control of a controller according to a schedule aimed at conserving the power of the ranging receiver. The ranging receiver also includes a navigation solver 31, including a state filter such as a Kalman filter, that uses a two-clock model according to the invention (i.e. constructed as indicated in FIG. 2) to determine the position (or other state of motion information, such as velocity) of the ranging receiver. The navigation solver uses, as input information, the schedule of operation of the two-clock assembly and also an initial estimate of the state of the ranging receiver, including an estimate of the state of motion of the ranging receiver at some initial time and also an estimate of the phase and fractional frequency of the two-clock assembly at the initial time. More particularly, what the navigation filter provides, via the state filter, is a current best estimate of the state x' of the ranging receiver (including the clock time according to the two-clock assembly and also the receiver position or velocity or other aspects of motion of the receiver) along with the process noise covariance Q' (indicating uncertainty in the current best estimate of the state x'). To provide the estimate x' and the process noise covariance Q', the navigation solver uses (as inputs) measurements (pseudoranges provided by a baseband processor 33 after extracting the pseudoranges from ranging codes acquired via a ranging antenna 34) and also an initial state estimate (including a clock phase estimate and a clock fractional frequency estimate and also an estimate of receiver position or other aspects of the motion of the ranging receiver). In providing the estimate x', the filter also uses information about the phase and fractional frequency of the two-clock system, but the information about the phase and fractional frequency of the two-clock system is implicit in the pseudoranges provided by the baseband processor 33, i.e. the phase and fractional frequency is provided to the baseband processor for its use in determining the pseudoranges.

In addition, to allow for assistance by an external computing facility in providing a navigation solution, the ranging receiver 30 also includes not only the ranging antenna 34, but also a cellular antenna 35 by which the external computing facility can receive from the ranging receiver information needed to provide a navigation solution, and then provide back to the ranging receiver navigation solution corresponding to the received information.

N-Clock Model and Other Generalizations

The method presented above for two clocks easily generalizes for multiple clocks. Assume that N clocks are operating in seriatim. Each clock has a clock model for a particular time interval, the first clock for time interval $\Delta t_1$ and so on, just as in eqs. (6) and (10) above. To arrive at an N-clock model, the invention combines the clocks one at a time. Thus, as in the two clock model above, the invention combines clock two with clock one (as in eq. (14) above) so as to cover the combined interval $\Delta t_1 + \Delta t_2$, then adds clock three (i.e. the model for clock three) in the same way that clock two was added to clock one, thus covering the period $\Delta t_1 + \Delta t_2 + \Delta t_3$, and so on until all of the clock models are combined, thus covering the period $\Delta t_1 + \Delta t_2 + \ldots + \Delta t_N$. Thus, for example, for a three-clock model, the update matrix equation is, $$\begin{bmatrix} x_1 \\ x_2 \end{bmatrix}_{k+3} = \begin{bmatrix} 1 & \Delta t_1 + \Delta t_2 + \Delta t_3 \\ 0 & 1 \end{bmatrix} \begin{bmatrix} x_1 \\ x_2 \end{bmatrix}_k + \begin{bmatrix} w_1 + \Delta t_2 w_2 + w_3 + \Delta t_3(w_2 + w_4) + w_5 \\ w_2 + w_4 + w_6 \end{bmatrix}. \quad (17)$$

The invention encompasses not only switching schedules such that, in a simple scheme, the time between measurements is equal to the combined time interval $\Delta t_1 + \Delta t_2 + \ldots + \Delta t_N$, but is any integral multiple of the combined time internal, i.e. is commensurate with the combined time interval, so that for example each clock is used twice between measurements, or each clock is used three times, and not necessarily for the same duration in each successive combined time interval (but such that the length of each combined time interval is the same). (And as explained below, other measurements intervals are also possible.) If the time interval between measurements changes, then the intervals during which each clock operates are made time-dependent, so that still, the overall duty cycle at any particular time consists of the (possibly time-varying) intervals during which each clock is active.

Clock System

Figure 4:
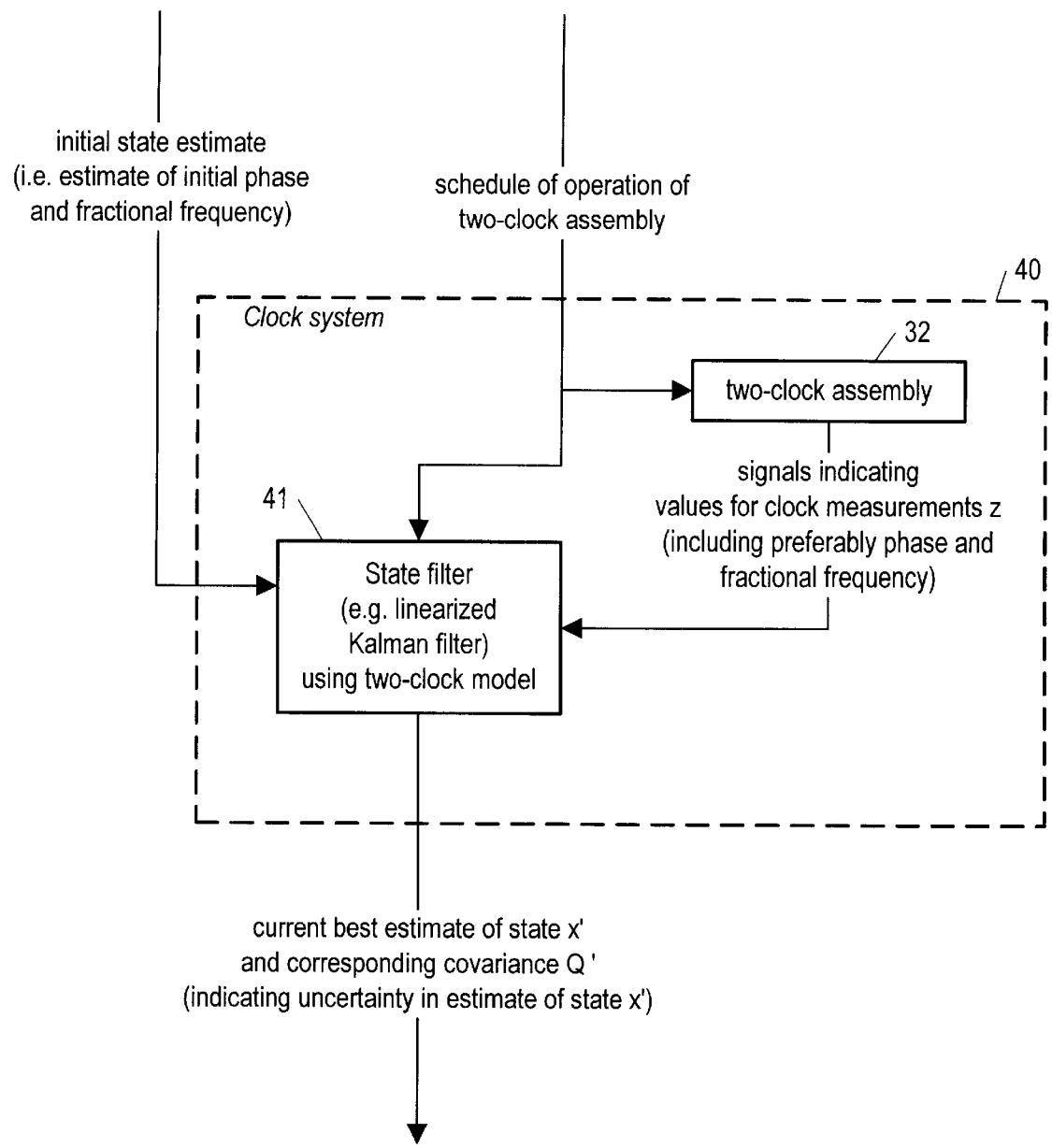
FIG. 4 is a block diagram of a clock system according to the invention (and so using a state filter adapted to use a two-clock model according to the invention)

Referring now to FIG. 4, the invention is shown more generally as a clock system 40, including a two-clock assembly 32 and a state filter 41 (such as a Kalman filter, or any filter that uses a combination of current and past measurement information and a predicted value for a current state to arrive at a best estimate of the current state of a subject system). The two-clock assembly 32, operative according to a schedule of operation indicating when during a cycle each clock is on, provides signals indicating a clock phase and a clock fractional frequency. The state filter 41, treating the signal provided by the clock assembly as measurements z (see eq. (16)) (and more specifically, indicating the phase and fractional frequency of the clock assembly, having one output for the two clocks of the assembly, as shown), and being provided with the schedule of operations of the two-clock assembly, uses the clock signals along with an initial estimate of the state of the clock, (i.e. an estimate of the clock phase and fractional frequency at some initial time), for providing the current best estimate of the state of the two-clock assembly using a two-clock model provided according to the method indicated in FIG. 2 (i.e. based on two single-clock models and the schedule of operation of the two-clock assembly comprising the two single clocks). The two-clock model includes a state update equation (eq. (14)) for updating the state x' of the two-clock assembly (i.e. for providing a best estimate of the state of the two-clock assembly at the time corresponding to an incremented value of the index k) and a corresponding process noise covariance matrix Q' (as given by eq. (15)).

Figure 5:
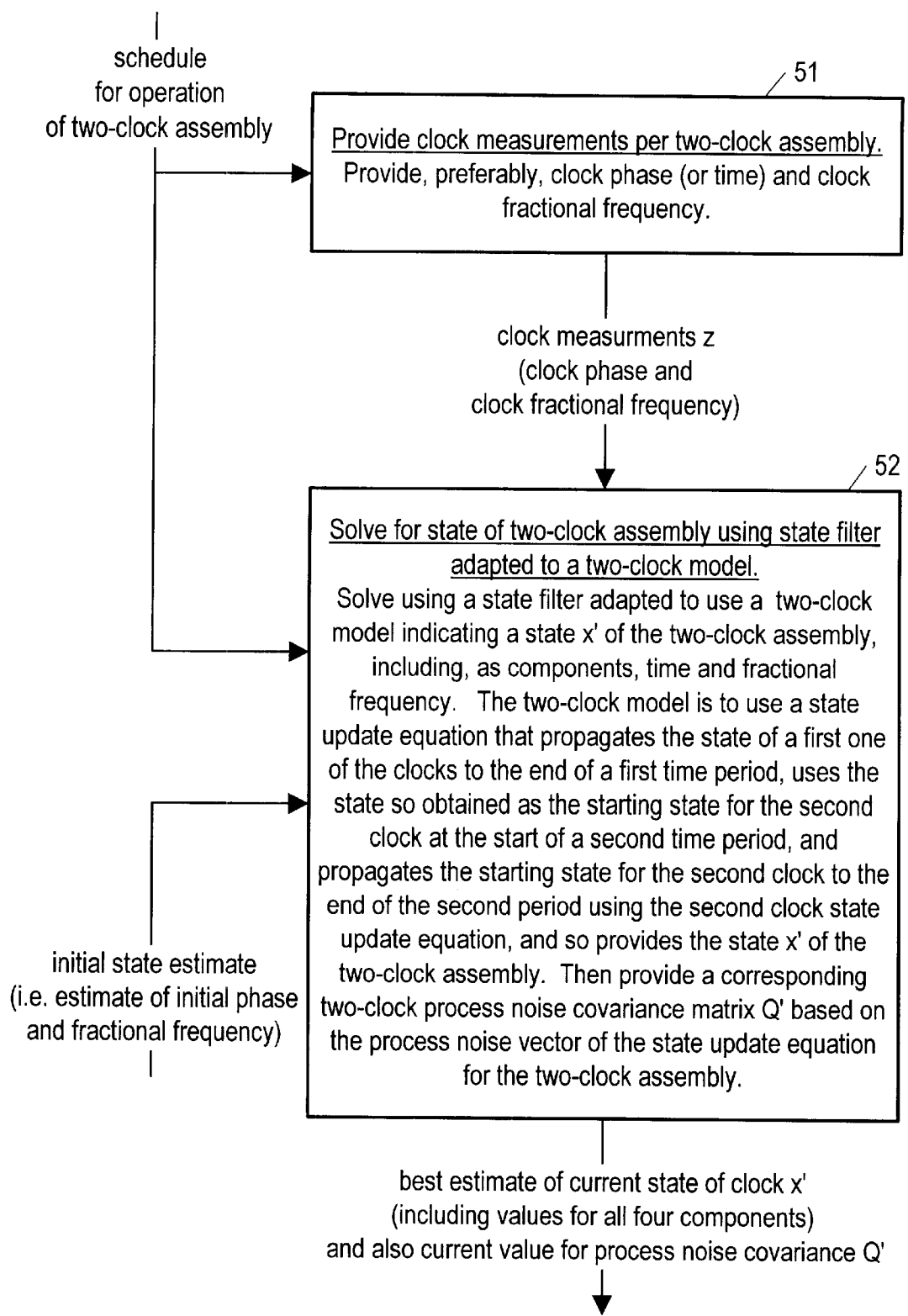
FIG. 5 is a flowchart of a method for providing the state of a clock system including a two-clock assembly using a state filter adapted to use a two-clock model according to the invention.

Referring now to FIG. 5, the invention is shown as a method for providing a best estimate of the state of a two-clock assembly including a first step 51 of providing clock measurements per a two-clock assembly in accordance with a schedule of operations indicating when during a duty cycle each of the two clocks is to be operative. What is provided is, preferably, clock phase and clock fractional frequency. In a next step 52, a best estimate of the state x' of the two-clock assembly (at successive instants of time) is provided using a state filter adapted to a two-clock model constructed as indicated in FIG. 2, and using as inputs the schedule of operation of the two-clock assembly and an estimate of the state of the two-clock assembly at some initial time, and also using as measurements the phase and fractional frequency of two-clock assembly.

The measurements here are for the assembly as a combined system, not measurements for each clock separately. The clock assembly is a black box that outputs some signals indicating information about time according to the combined sequential oscillations of each of the clocks/oscillators of the assembly; the measurements are not necessarily performed at the ends of the different periods during which the different clocks/oscillators are powered on. Thus, in a two-clock assembly, the measurement of the clock at any instant of time reflects the operation of both of the clocks, and measurements of the difference in time between two instants of time also may reflect the operation of both clocks. In a particularly simple scheme for a two clock system, we measure time (i.e. we sample the output signal of the clock assembly) at a period which is a multiple of the combined period (the period of operation of the first clock plus the period of operation of the second clock) and at the end of each combined period, but it is not at all necessary to perform clock measurements according to such a simplistic scheme. The clock (assembly) can be sampled at any time, according to any schedule.

The state of the two-clock assembly is preferably clock phase and clock fractional frequency. Thus, the state filter uses a two-clock model indicating a state x' of the two-clock assembly, including, as components, clock phase and fractional frequency, and uses a state update equation that propagates the state of a first one of the clocks to the end of a first time period, uses the state so obtained as the starting state for the second clock at the start of a second time period, and propagates the starting state for the second clock to the end of the second period using the second clock state update equation, and so provides the state x' of the two-clock assembly. The step 52 also provides a corresponding two-clock process noise covariance matrix Q', as indicated in eq. (15).

Scope of the Intention

It is to be understood that the above-described arrangements are only illustrative of the application of the principles of the present invention. In particular, it is clear from what has been described that the method of the invention is not limited to state update equations involving only state vectors having two components; the invention encompasses state vectors of any number of components. Further, it should be understood that the invention is not limited to arrangements in which the navigation solution is carried out entirely by a ranging receiver; the invention also encompasses having at least part of the navigation solution carried out by computing facilities that are separate and distinct from the ranging receiver, and that communicate with the ranging receiver by e.g. a telecommunications system (the ranging receiver being therefore possibly specially adapted to include the capability of receiving information over a telecommunications network, e.g. by including an antenna and receiver for a telecommunications network). Numerous modifications and alternative arrangements may be devised by those skilled in the art without departing from the spirit and scope of the present invention, and the appended claims are intended to cover such modifications and arrangements.

What is claimed is:

1. A method of providing an estimate of a current state of a clock assembly of at least two clocks including a first clock and a second clock, each clock having a clock phase and a clock fractional frequency, the method comprising:
   a) a step (51), responsive to a schedule of operations indicating a first time period in a cycle of operation when the first clock is operative and a second time period when the second clock is operative, of providing a clock measurement (z) indicating information about the clock assembly, and
   b) a step (52), responsive to the clock measurement (z) and also responsive to the schedule of operations, for providing the a estimate of a current state (x') of the clock assembly using a state filter adapted to use a clock model for the clock assembly, the clock model indicating a state (x') of the clock assembly via a state update process that includes a measure of process noise ($\overline{w}_{(k+1,k)}$) and that propagates the state of the first clock to the end of the first time period in accordance with the schedule of operations using a state update process for the first clock, uses the state so obtained as the starting state for the second clock at the start of a second time period, and propagates the starting state for the second clock to the end of the second period using a state update process for the second clock, and also for providing a corresponding measure of process noise covariance (Q').

2. A method as in claim 1, wherein the measure of process noise ($\overline{w}_{(k+1,k)}$) is a process noise vector ($\overline{w}_{(k+1,k)}$), wherein the measure of process noise covariance (Q') is a process noise covariance matrix (Q'), wherein the clock measurement (z) indicates information about the phase and fractional frequency of the clock assembly, and further wherein the process noise covariance matrix (Q') corresponding to the estimate of the current state (x') of the clock assembly is based on taking the mathematical expectation of the outer product of the process noise vector ($\overline{w}_{(k+1,k)}$) of the state update process with itself.

3. A method as in claim 2, wherein the step (52) of providing the estimate of a current state (x') of the clock assembly is performed as part of a step of providing an estimate of a current state (x') of a ranging receiver used in conjunction with beacons of a positioning system, and wherein the method further comprises a step of providing pseudoranges from the beacons of the positioning system.

4. A method as in claim 3, wherein the state (x') of the ranging receiver includes as components a clock phase component and a clock frequency component for the clock assembly and also includes either a position component or a velocity component indicating either the position or velocity of the ranging receiver, respectively.

5. A clock system (40) for providing an estimate of a current state of a clock assembly (32) including at least two clocks, the clock system comprising:
   a) the clock assembly (32), responsive to a schedule of operations indicating when in a cycle of operation each of the two clocks is operative, for providing clock signals indicating a clock measurement (z) conveying information about the clock assembly; and
   b) a state filter (41), responsive to the clock signals indicating the clock measurement (z), and further responsive to the schedule of operations, for providing the estimate of the current state (x') of the clock assembly, wherein the state filter is adapted to use a clock model for the clock assembly, the clock model indicating the state (x') of the clock assembly via a state update process that includes a measure of process noise ($\overline{w}_{(k+1,k)}$) and that propagates the state of a first one of the clocks of the clock assembly to the end of a first time period in accordance with the schedule of operations using a state update process for the first clock, uses the state so obtained as the starting state for a second clock of the clock assembly at the start of a second time period, and propagates the starting state for the second clock to the end of the second period using a state update process for the second clock, and also for providing a corresponding measure of process noise covariance (Q').

6. A clock system as in claim 5, wherein the measure of process noise ($\overline{w}_{(k+1,k)}$) is a process noise vector ($\overline{w}_{(k+1,k)}$), wherein the measure of process noise covariance (Q') is a process noise covariance matrix (Q'), wherein the clock measurement (z) indicates information about the phase and fractional frequency of the clock assembly, and further wherein the process noise covariance matrix (Q') corresponding to the estimate of the current state (x') of the clock assembly is based on taking the mathematical expectation of the outer product of the process noise vector ($\overline{w}_{(k+1,k)}$) of the state update process with itself.

7. A ranging receiver (30) for use with beacons of a positioning system, comprising a clock system as in claim 5 and a navigation solver (31), wherein the state filter (41) is adapted for use in the ranging receiver (30) as part of the navigation solver (31), and wherein the state filter (41) is further responsive to pseudoranges determined from signals provided by the beacons of the positioning system, and wherein the state (x') estimated by the state filter (41) includes the state of the clock assembly (32) as well as the state of the ranging receiver (30) in respect to an aspect of the position of the ranging receiver as a function of time.

8. A ranging receiver (30) as in claim 7, wherein the measure of process noise ($\overline{w}_{(k+1,k)}$) is a process noise vector ($\overline{w}_{(k+1,k)}$), wherein the measure of process noise covariance (Q') is a process noise covariance matrix (Q'), wherein the clock measurement (z) indicates information about the phase and fractional frequency of the clock assembly, and further wherein the process noise covariance matrix (Q') corresponding to the estimate of the current state (x') of the clock assembly is based on taking the mathematical expectation of the outer product of the process noise vector ($\overline{w}_{(k+1,k)}$) of the state update process with itself.

9. A clock system as in claim 8, wherein the state (x') of the ranging receiver includes as components a clock phase component and a clock fractional frequency component, and also includes either a position component or a velocity component indicating either the position or velocity of the ranging receiver, respectively.

10. A system, comprising a ranging receiver (30) as in claim 7, and the beacons of the positioning system.

* * * * *

UNITED STATES PATENT AND TRADEMARK OFFICE
CERTIFICATE OF CORRECTION

PATENT NO.     : 6,651,031 B2
DATED          : November 18, 2003
INVENTOR(S)    : David Akopian It is certified that error appears in the above-identified patent and that said Letters Patent is hereby corrected as shown below:

Column 7,
Line 21, "5 for which a" should be -- for which a --.

Equation (3), "$Q_k = \begin{bmatrix} E(w_{1,k}^2) & E(w_{1,k}w_{2,k}) \\ E(w_{1,k}w_{2,k}) & E(w_{1,k}^2) \end{bmatrix} = E(\bar{w}_k \bar{w}_k')$" should be -- $Q_k = \begin{bmatrix} E(w_{1,k}^2) & E(w_{1,k}w_{2,k}) \\ E(w_{1,k}w_{2,k}) & E(w_{2,k}^2) \end{bmatrix} = E(\bar{w}_k \bar{w}_k')$ --.

Equation (5), at about line 53, -- = $\begin{bmatrix} S_1\Delta t + \frac{S_2\Delta t^3}{3} & S_2\Delta \frac{t^2}{2} \\ S_2\Delta \frac{t^2}{2} & S_2\Delta t \end{bmatrix}$ -- should be -- = $\begin{bmatrix} S_1\Delta t + \frac{S_2\Delta t^3}{3} & \dot{S}_2 \frac{\Delta t^2}{2} \\ S_2 \frac{\Delta t^2}{2} & S_2\Delta t \end{bmatrix}$ --.

Column 8,
Equation 10, "~ $\bar{x}_{k+2} = \Phi_{k+2,k+1,k} x_{k+1} + \bar{w}_{k+1}$" should be
-- ~ $\bar{x}_{k+2} = \Phi_{k+2,k+1} x_{k+1} + \bar{w}_{k+1}$ --.

Signed and Sealed this

Thirty-first Day of August, 2004

JON W. DUDAS
*Director of the United States Patent and Trademark Office*